United States Patent [19]
Grove

[11] Patent Number: 4,987,413
[45] Date of Patent: Jan. 22, 1991

[54] AIRCRAFT TERRAIN WARNING SYSTEM WITH CONFIGURATION MODIFIED WARNING AND IMPROVED MODE SWITCHING

[75] Inventor: Michael M. Grove, Snohomish, Wash.

[73] Assignee: Sundstrand Data Control, Inc., Redmond, Wash.

[21] Appl. No.: 58,111

[22] Filed: Jun. 4, 1987

Related U.S. Application Data

[63] Continuation of Ser. No. 704,348, Feb. 22, 1985, abandoned, and a continuation of Ser. No. 704,366, Feb. 22, 1985, abandoned.

[51] Int. Cl.$^5$ .............................................. G08B 23/00
[52] U.S. Cl. ................................. 340/970; 73/178 T; 340/963; 364/433
[58] Field of Search ............... 340/959, 963, 967, 969, 340/970, 971, 968, 977; 364/427, 428, 431.01, 433-434; 73/178 R, 178 T; 244/180, 183; 342/65

[56] References Cited

U.S. PATENT DOCUMENTS

| | | | |
|---|---|---|---|
| 3,715,718 | 2/1973 | Astengo | 340/970 |
| 3,890,614 | 6/1975 | Argentieri et al. | 340/977 |
| 3,946,358 | 3/1976 | Bateman et al. | 340/970 |
| 4,121,194 | 10/1978 | Downey et al. | 340/959 |
| 4,293,840 | 10/1981 | Hadari | 340/970 |
| 4,319,218 | 3/1982 | Bateman | 340/970 |
| 4,431,994 | 2/1984 | Gemin | 340/970 |
| 4,433,323 | 2/1984 | Grove | 340/970 |
| 4,495,483 | 1/1985 | Bateman | 340/970 |
| 4,551,723 | 11/1985 | Paterson | 340/970 |
| 4,593,285 | 6/1986 | Miller et al. | 340/968 |
| 4,675,823 | 6/1987 | Noland | 340/970 |

FOREIGN PATENT DOCUMENTS

| | | | |
|---|---|---|---|
| 2139588A | 11/1984 | United Kingdom | 340/970 |
| 2139589A | 11/1984 | United Kingdom | 340/970 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

A proximity to terrain warning system for aircraft utilizes a first set of warning criteria to generate a warning in the event of insufficient terrain clearance after take off. A different set of criteria are employed to generate warnings when the aircraft in in a cruise or approach phase of flight or on a tactical mission. Mode switching is provided to select the appropriate criteria and to select an excessive descent after take-off set of warning criteria in addition to the first set of criteria when appropriate.

11 Claims, 4 Drawing Sheets

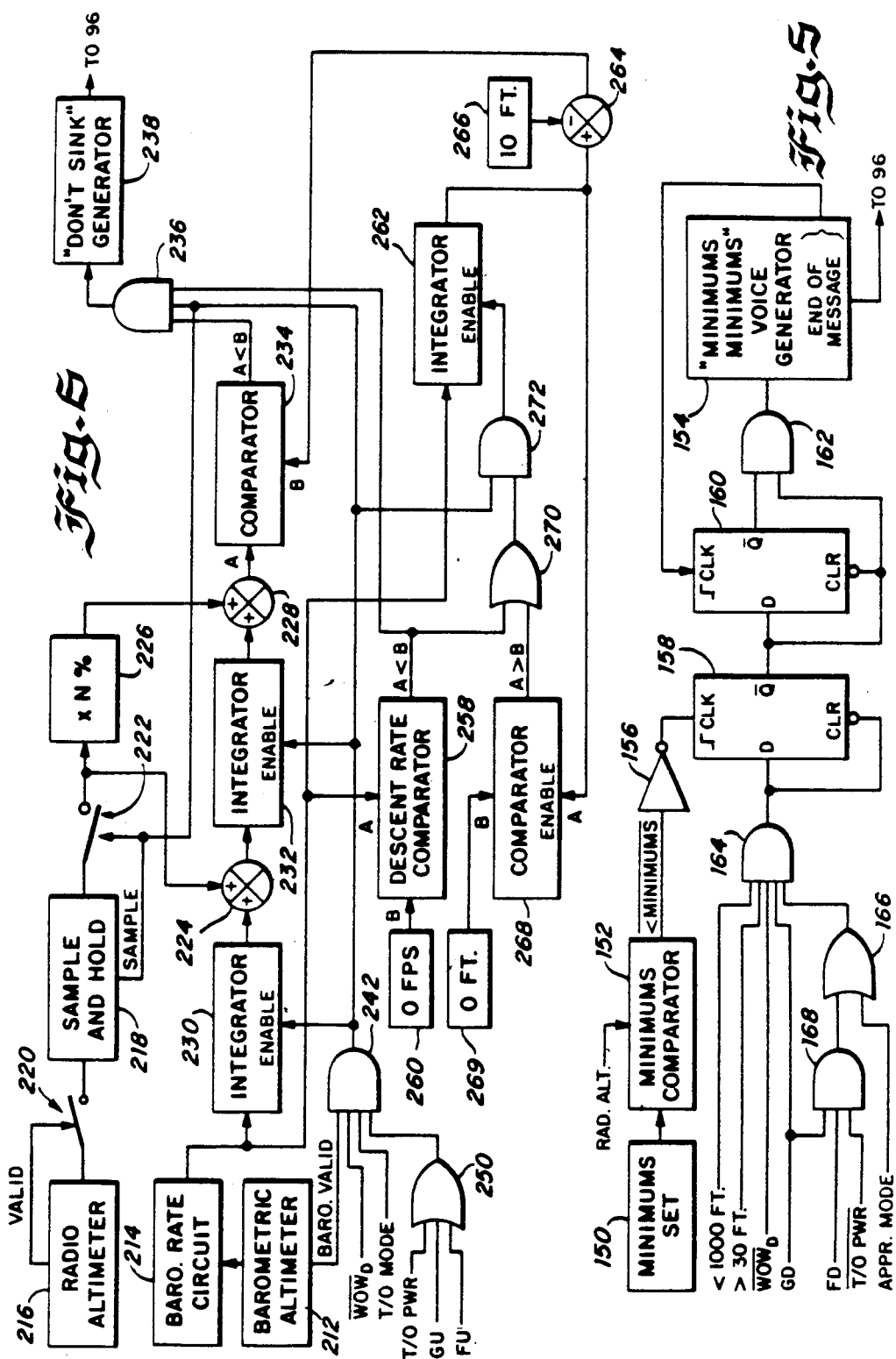

AIRCRAFT TERRAIN WARNING SYSTEM WITH CONFIGURATION MODIFIED WARNING AND IMPROVED MODE SWITCHING

CROSS REFERENCE

This application is a continuing application of application Ser. Nos. 06/704,348 and 06/704,366, both filed Feb. 22, 1985 and both now abandoned. All subject matter contained herein can be found in the aforesaid applications.

BACKGROUND OF THE INVENTION

Ground proximity warning systems that have a terrain clearance mode which provides a pilot with a warning in the event that the aircraft should descend below a predetermined altitude above the ground are known. Examples of such systems are described in U.S. Pat. Nos. 3,946,358, 3,944,968 and 4,030,065. Such terrain clearance warning systems are generally not used alone, but rather are used in conjunction with other warning criteria to warn the pilot of other hazardous conditions, such as excessive closure rate with terrain, excessive sink rate, excessive descent after take off, excessive descent below the glide slope and descent below a preset minimum altitude to form a ground proximity warning system. These different warning criteria are often referred to as modes of operation. Not all of the modes of operation are generally enabled simultaneously, and mode switching is provided to switch to the appropriate mode or modes associated with a particular phase of flight.

A ground proximity warning system employing multiple warning modes is described in U.S. Pat. No. 3,946,358. The aforementioned patent discusses a negative climb after take-off mode, which is activated upon take off and generates a warning if the aircraft should descend excessively before reaching seven hundred feet of radio altitude. Also described is mode switching circuitry for switching between the negative climb after take-off mode and the terrain clearance modes. Other patents that disclose various warning modes and mode switching circuitry are U.S. Pat. Nos. 3,947,810; 4,319,218 and 4,433,323.

The above-described systems are designed for transport aircraft and utilize signals representative of landing gear and flap position to alter the warning criteria and effect mode switching. However, not all aircraft are operated as are transport aircraft, and consequently, flap and gear position may not be a reliable indicator of the phase of flight, particularly, in the case of military aircraft, such as, for example, the Lockheed S3-A. In addition, military aircraft have different flight and operational characteristics than transport aircraft, and additional sets of warning criteria must be provided to accommodate such aircraft and the ways in which they are operated.

SUMMARY OF THE INVENTION

Thus, it is an object of the present invention to provide a ground proximity warning system for aircraft with configuration responsive warning criteria that are optimized for the flight and operational conditions of carrier based tactical aircraft, such as the Lockheed S3-A.

It is yet another object of the present invention to provide a ground proximity warning system having mode switching logic designed for the operational and flight characteristics of military aircraft.

Thus, in accordance with a preferred embodiment of the invention, there is provided a ground proximity warning system that provides the pilot with a warning of insufficient terrain clearance as determined by a first set of criteria upon take off, and according to a second set of criteria during cruise, approach, or when a tactical mission is being flown. The system also provides other warnings in the event of an excessive altitude loss after take off, or in the event that the aircraft drops below a preset minimum altitude above ground, and mode switching is provided so that the appropriate mode or modes and criteria are selected.

DESCRIPTION OF THE DRAWING

These and other objects and advantages of the present invention will become readily apparent upon consideration of the following detailed description and attached drawing, wherein:

FIG. 6 is a logical block diagram illustrating the operation of the excessive descent after takeoff mode of operation;

FIG. 7 illustrates the criteria under which a warning will be generated due to an excessive descent after take off; and FIG. 8 is a logical block diagram of a circuit suitable for providing a mission select signal.

DETAILED DESCRIPTION OF THE PREFERRED EMBODIMENT

Figure 1:
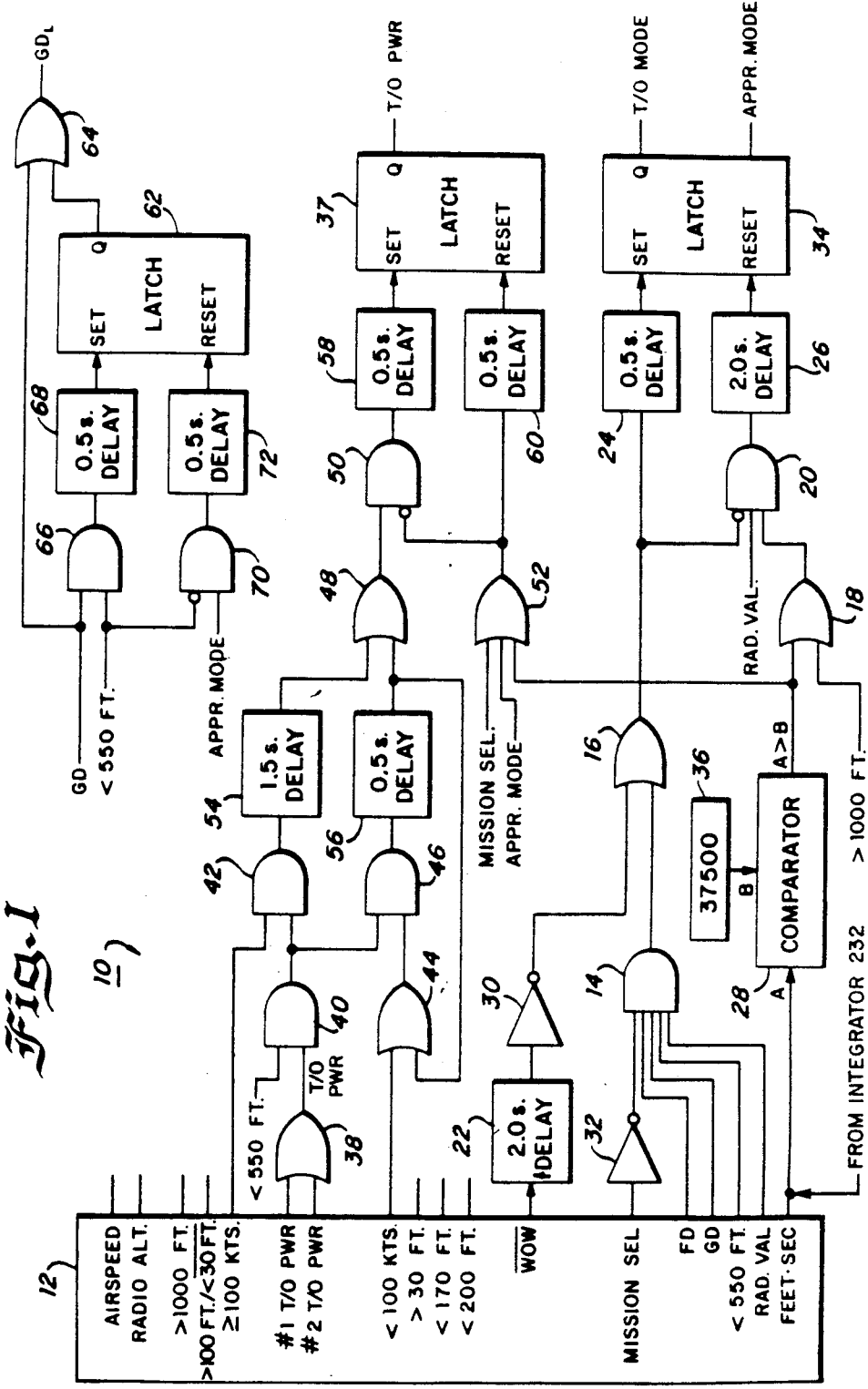
FIG. 1 is a logical block diagram of the mode selection logic that selects the appropriate mode or modes of operation depending on the flight condition of the aircraft.

Referring now to the drawing, with particular attention to FIG. 1, there is shown the mode switching logic of the system according to the invention. Basically, the function of the logic illustrated in FIG. 1 is to indicate whether the aircraft is in a take-off mode or in an approach mode in order to select the appropriate mode and warning criteria. For example, in the take-off mode, the first (take-off) set of criteria for the insufficient terrain clearance mode of operation are selected and the excessive descent after take-off mode may be enabled. The modes and criteria are selected by monitoring gear position, flap position, altitude, take-off power and other flight parameters. In the approach mode, the excessive descent after take-off mode is disabled. This is also a necessary, but not sufficient condition to enable the second set of criteria for the terrain clearance mode.

The mode selection logic, generally designated by the reference numeral 10 in FIG. 1, utilizes a plurality of signals from other aircraft instruments that are obtained from a data bus 12. Although a data bus 12 is illustrated in FIG. 1 for purposes of illustration, it should be understood that the signals could be obtained from individual instruments. In the illustrated embodiment, the signals provided by the data bus 12 for use by the circuitry of FIG. 1 and FIG. 2 include airspeed, radio altitude, whether engines number 1 and number 2 are at take-off power, whether the aircraft is above 1000 feet of radio altitude, whether the aircraft is above 30 feet, after having gone above 100 feet of radio altitude, whether the speed of the aircraft is less than or greater than 100 knots, whether there is weight on wheels, whether a tactical mission has been selected, the position of the landing gear and flaps, whether the aircraft is below 550 feet, below 200 feet, above 30 feet, whether the radio altitude signal is valid and a time-altitude or feet-seconds signal, which is a product of the altitude above ground of the aircraft and the length of time that the aircraft has been airborne. The airspeed signal may be obtained, for example, from an airspeed indicator and the radio altitude from a radio altimeter, either directly or from the data bus 12. The number 1 and number 2 take-off power signals may be obtained from, for example, tachometers connected to the two engines of the Lockheed S3-A aircraft or from throttle position switches. These vary to accommodate however many engines may be present in other aircraft. The altitude and airspeed reference signals, such as, for example, the greater or less than 100 knots signal, the greater or less than 550 feet signal, the greater than 1000 feet signal, and the greater than 30 feet signal, the less than 200 feet signal, greater than 100 feet and not less than 30 feet signal can be obtained from comparators coupled to the radio altimeter and airspeed signals. The no weight on wheels, flaps down (FD) and gear down (GD) signals may be obtained from discrete circuit elements coupled to the flaps and landing gear, and the mission select signal may be obtained from a manually operable momentary switch that is actuated by the pilot before or during a tactical mission One way to obtain the time-altitude signal, or feet-seconds signal is illustrated in U.S. patent application Ser. No. 06/704,366, entitled "ALTITUDE LOSS AFTER TAKE-OFF WARNING SYSTEM UTILIZING TIME AND ALTITUDE", filed on Feb. 22, 1985 by the same inventor, Michael M. Grove, and incorporated herein by reference. The circuitry for obtaining a time-altitude signal is also illustrated in FIG. 6. Specifically, the time-altitude signal may be obtained from the integrator 232.

Among the parameters that indicate whether the aircraft is in a take-off mode or an approach mode of operation are the elapsed time since take off, altitude, flap and gear position, and whether or not a tactical mission has been selected. Signals representative of these parameters are monitored by a series of gates 14, 16, 18 and 20, delay circuits 22, 24 and 26, a comparator 28, inverters 30 and 32, and a latch 34. The latch 34 is settable to a set condition wherein a take-off mode signal is produced at its Q output and reset to an approach mode wherein an approach mode signal appears at its $\overline{Q}$ output. The take-off mode is selected if there is no weight on the wheels for 2.5 seconds by the circuitry including the delays 22 and 24, the OR gate 16 and the inverter 30. The take-off mode is also selected by the gates 14, 16, the delay 24 and the inverting amplifier 32 if a mission has not been selected, the flaps are down, the gear is down, the aircraft is below 550 feet of radio altitude and the radio altimeter signal is valid. The latter circuitry serves to enable the take-off mode during an approach, after descending below 550 feet with gear and flaps in landing configuration. However, a warning cannot be generated in the take-off mode until the take-off power is applied or gear or flaps are retracted, as is discussed in a subsequent portion of the application.

The latch 34 is set during the above described stage of flight so that the enabled take-off warning modes can be immediately activated should take-off power be engaged during a go-around after a missed approach.

The approach mode is automatically selected as a function of altitude and the length of time that the aircraft has been flying by the circuitry including gates 18, 20, the comparator 28 and delay 26. The selection of the approach mode occurs when the radio altitude signal is valid and none of the conditions defining a take-off mode are met, as evidenced by the output of the gate 16, and when either the time-altitude product exceeds a predetermined value as defined by a reference circuit 36 or the aircraft has exceeded a predetermined altitude. For example, if the altitude of the aircraft exceeds 1000 feet and the other conditions are met, the approach mode is selected by the gates 18, 20 and the delay 26. Similarly, if the time-altitude product exceeds a predetermined value, for example, 37,500 feet-seconds, the comparator 28 applies a signal to the gate 18 to select the approach mode.

In the event of a missed approach with a military aircraft such as the Lockheed S3-A, the gear and/or flaps are not always raised during a go-around as in the case of commercial aircraft. Thus, the flap and gear cycling signals are not necessarily present to enable the warning modes that are normally operative during take off. Therefore, a signal representative of take-off power is provided by the system according to the invention to enable those modes in the event of a go-around after a missed approach. This function is provided by logic circuitry including a latch 37, a series of gates 38, 40, 42, 44, 46, 48, 50 and 52 and delay circuits 54, 56, 58 and 60. The take-off power signal is provided by the Q output of the latch 37 when the latch 37 is set. In order to set the latch 37, the power of the two engines is monitored by the gate 38, and in the event that either engine is operating at take-off power, and the aircraft is below 550 feet of radio altitude, and the speed of the aircraft is in excess of 100 knots, the latch 36 is set after a two second time delay (the combined delay of the delay circuits 54 and 58). These parameters are indicative of a missed approach and enable the take-off modes for the go-around. If the speed of the aircraft is below 100 knots and if either engine is operating at take-off power and the aircraft is below 550 feet for a period of 0.5 second (the delay of the delay circuit 56), the output of delay circuit 56 is latched via the feedback to OR gate 44, thereby requiring the greater than 100 knots condition for only 0.5 seconds. The latch 37 is then set by the gates 44 and 46 and the delay circuit 56 via the gates 48 and 50 after the 0.5 second delay introduced by the delay circuit 58. The aforementioned conditions are typically encountered in the event that an arresting cable on an aircraft carrier breaks upon being hooked by the tail hook of the aircraft, and it is desirable to enable the take-off modes in the event of such an occurrence. The gate 52 and the delay circuit 60 serve to reset the latch 37 when the aircraft is in the approach mode, as evidenced by the Q signal from the latch 34, or the mission select switch has been activated or the time-altitude product exceeds 37,500 feet. Also, if any one of these conditions is present, the gate 50 is disabled, and the latch cannot be set.

A gear down latched (GDL) signal is provided by a gate 64 when the gear down (GD) signal is present or when a latch 62 has been set by an AND gate 66 via a delay circuit 68 when both the gear is down and the aircraft is below 550 feet for a period of 0.5 second, the delay of the delay circuit 68. The latch 62 is reset by the AND 70 via the delay circuit 72 if the aircraft is in the approach mode and above 550 feet of altitude for 0.5 second, the delay of the circuit 72. The latch 62 serves to remember that the gear has been positioned in landing configuration during the current approach.

Figure 2:
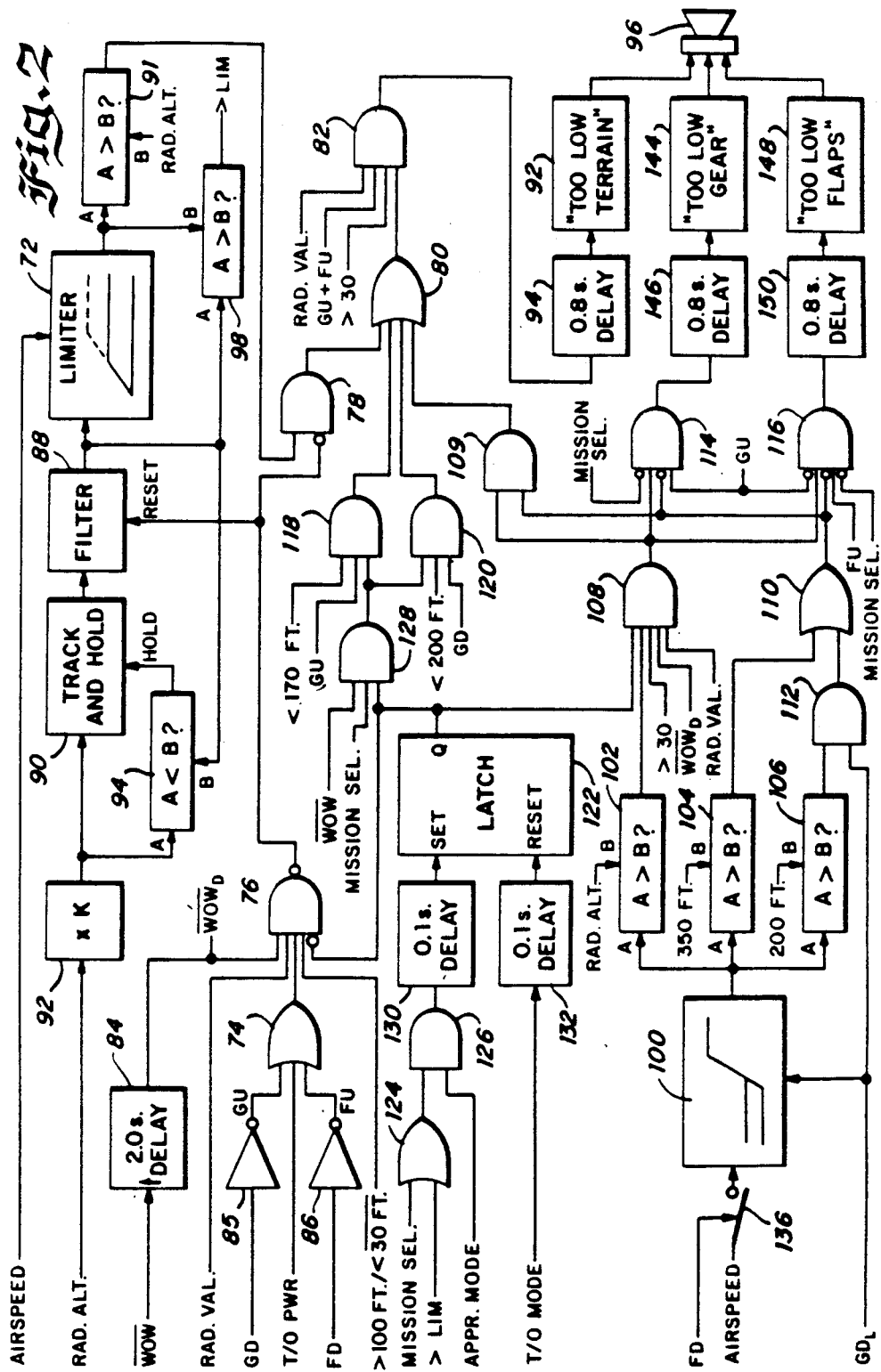
FIG. 2 is a logical block diagram illustrating the operation of the terrain clearance mode of operation.
Figure 3:
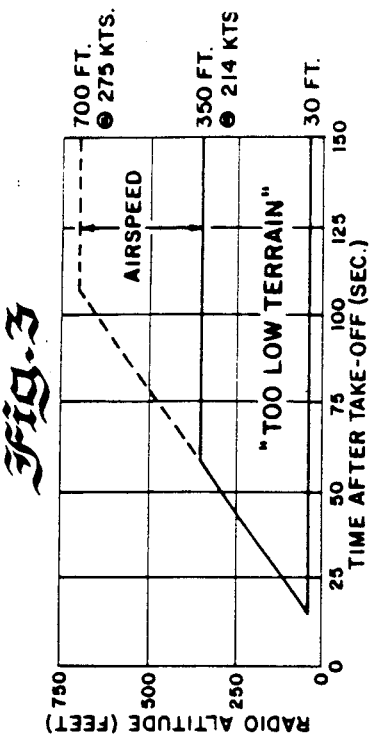
FIGS. 3 and 4 illustrate the criteria under which a warning will be generated due to insufficient terrain clearance after take off and during other phases of flight.

The terrain clearance warning function is provided by the circuitry illustrated in block diagram form in FIG. 2. The circuitry of FIG. 2 serves to select one of two different sets of warning criteria depending on the phase of flight of the aircraft as defined by the signals obtained from the mode selection logic circuitry of FIG. 1. One of two warning criteria are selected. The first warning criteria are selected after take off and are illustrated in FIG. 3. It should be noted that the envelope illustrated in FIG. 3 is dynamic in nature and assumes a particular flight profile (i.e., a constant ten feet per second climb rate over flat terrain or water). The dynamics of this warning mode will become evident in the detailed description that follows. FIG. 3 is provided for illustrative purposes. This mode of operation is enabled by a series of gates 74, 76, 78, 80 and 82. The gate 76 enables the gate 78 only when the weight has been off the wheels for two seconds as defined by a delay circuit 84, and the radio altitude signal is valid, and the aircraft has exceeded 100 feet above the ground without subsequently going to less than 30 feet above the ground and either the landing gear is up or the flaps are up or take-off power has been engaged. The gear up (GU) and flaps up (FU) signals are obtained by inverting the GD and FD signals with a pair of inverters 85 and 86. Also, for the gate 76 to be enabled, the conditions for selecting the second set of terrain clearance criteria cannot be met, as will be discussed in a subsequent portion of the specification.

Once the aforementioned conditions are met, a long term filter (15 second time constant) 88 is enabled by the gate 76. The filter 88 is charged by the output of a track and hold circuit 90 which receives a scaled radio altitude signal from a scaling circuit 92. In the illustrated embodiment, the scaling factor K is selected to be 0.75 and thus, the radio altitude signal is multiplied by 0.75 by the scaling circuit 92. A comparator 94 compares the output of the scaling circuit 92 with the output of the filter 88 and controls the track and hold circuit 90 in accordance with the comparison. If the output of the scaling circuit 92 is greater than the output of the filter 88, the track and hold circuit operates in a track mode. If the output of the filter 88 exceeds the output of the scaling circuit 92, the track and hold circuit 90 is switched to a hold mode of operation. Thus, the filter 88 can only charge in the positive direction, and the only way the output of the filter 88 can be reduced is by resetting the filter 88 via the gate 76.

The output of filter 88 is applied to the limiter 72, which limits its output to greater than 0 feet and less than a value that is a function of airspeed which is also on input to limiter 72. As is illustrated in FIG. 3, the maximum altitude at which a warning may be generated is increased, preferably linearly, as a function of airspeed from 350 feet at 214 knots to 700 feet at 275 knots and above. Accordingly, the output of the limiter 72 is limited as function of the airspeed of the aircraft to 350 feet at less than 214 knots, expanding to 700 feet at a greater than 275 knots. This output reflects a filtered function of 75 percent of the aircraft's altitude above the ground during the take-off stage of flight and up to such a time as the value reaches a limit which is a function of airspeed. This output is compared with the radio altitude by a comparator 91. If the relationship between the output of the limiter 72 and radio altitude is such that the radio altitude signal is less than the output of the limiter 72, thus indicating that the envelope illustrated by FIG. 3 has been penetrated, then an enabling signal is applied to the AND gate 78. If the gate 76 has been fully enabled, and if the gate 82 is also enabled, then a "TOO LOW TERRAIN" warning will be generated by a warning generator 92 after a 0.8 second delay introduced by a delay circuit 94. The "TOO LOW TERRAIN" signal will be applied either directly or indirectly to a transducer such as a loudspeaker 96 to provide an aural warning to the pilot.

Figure 4:
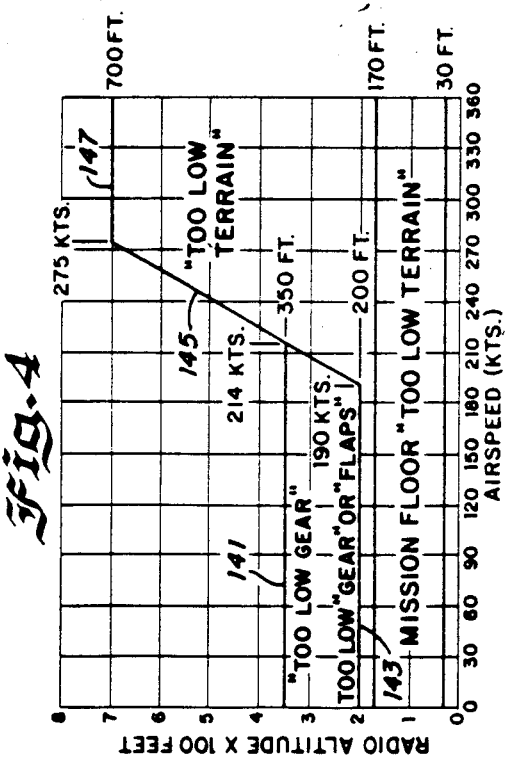
Figure 1:
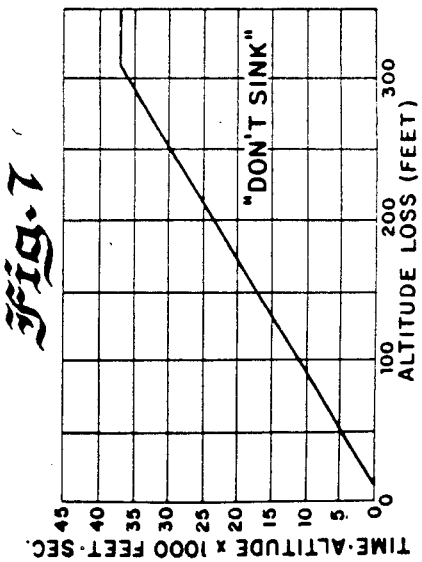

A comparator 98 compares the output of the limiter 72 with its input, and if its input should exceed its output, thus indicating that the limiter 72 is in limiting, the comparator 98 will generate a greater than LIM signal to cause the circuit to switch to the second set of criteria. The second set of warning criteria are illustrated in FIG. 4, and are used during the approach, cruise and mission selected, or tactical, phases of flight. The second warning criteria are defined by a function generator 100, comparators 102, 104 and 106, and gates 108, 109, 110, 112, 114, 116, 118 and 120. Which of the two warning criteria are selected is determined by a latch 122, gates 124, 126 and a pair of delay circuits 130 and 132. The latch 122 is set in order to select the warning criteria illustrated in FIG. 4 by the gates 124 and 126 if the approach mode signal (from FIG. 1) is present and either the greater than LIM signal or the mission select signal is present for at least 0.1 second, the delay time of the delay circuit 130.

When the second criteria are selected, the airspeed signal is applied to the function generator 100 via a switch which is closed only when the flaps are up. The airspeed signal is operated on by the function generator 100 and applied to the three comparators 102, 104 and 106 which compare the signal from the function generator 100 with the radio altitude, a signal representative of 350 feet of radio altitude and a signal representative of 200 feet of radio altitude, respectively. These altitude references correspond to the 200 and 350 foot altitude warning boundaries illustrated by the warning boundaries 141 and 143 in FIG. 4, and serve to distinguish between the "TOO LOW TERRAIN", "TOO LOW GEAR" and "TOO LOW FLAP" warning messages. The radio altitude signal, when compared with the output of function generator 100, determines if any of the warnings listed above is to be activated.

The outputs 104 and 106 are connected to the gates 110 and 112 which cooperate with the gates 114 and 116 to select the appropriate warning to be given. The output of the gate 114 is connected to a "TOO LOW GEAR" warning generator 144 via a 0.8 second delay circuit 146. The output of the gate 116 is connected to a "TOO LOW FLAPS" generator 148 via a 0.8 second delay 150. Thus, when the gear is up, a mission is not selected, and the gate 108 is enabled, the "TOO LOW GEAR" warning will be generated if the aircraft drops below 350 feet. If the gear is down and the flaps are up, the "TOO LOW FLAPS" warning will be generated below an altitude above ground of 200 feet. The gates 108, 109, 110, 112, 80 and 82, cooperate to generate the "TOO LOW TERRAIN" warning if the aircraft is flying above 30 feet of radio altitude, there is no weight on the wheels, the radio altitude signal is valid and the gear and flaps are up whenever the envelope defined by the lines 145 and 147 of FIG. 4 is penetrated.

If the mission select switch has been actuated, there is no weight on wheels, the gear is up and the aircraft descends below 170 feet of radio altitude, the "TOO LOW TERRAIN" warning will be generated. This operation is controlled by the gates 128, 118, 80 and 82. If the aforementioned conditions are met, but the landing gear is down and the flaps are up, the "TOO LOW TERRAIN" warning will be initiated by the gate 120 in cooperation with the gates 80 and 82 at a higher altitude, for example, if the aircraft drops below 200 feet.

Figure 5:
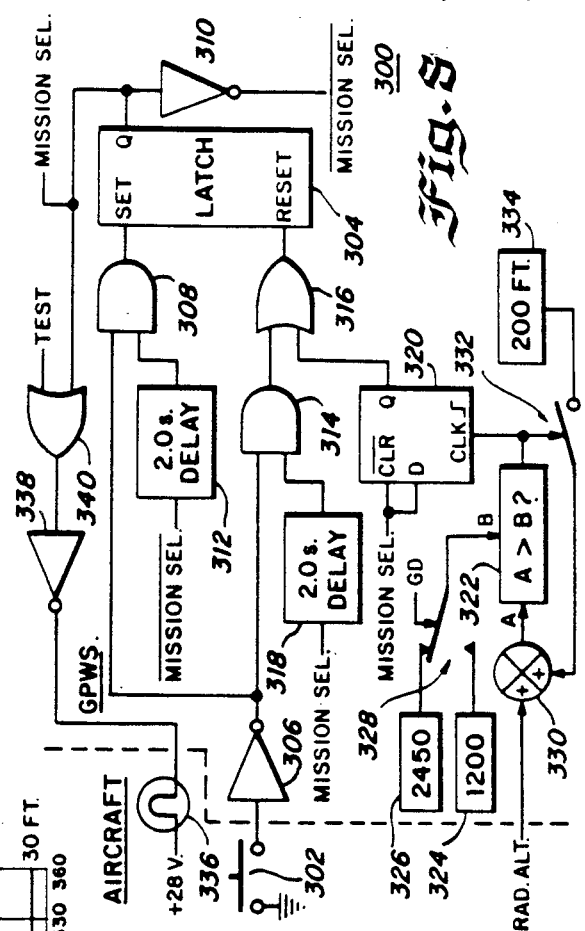
FIG. 5 is a logical block diagram illustrating the operation of a minimums mode of operation.

It is also useful to have an independent minimums warning which can be set by the pilot so that the minimums warning is given whenever the aircraft drops below a predetermined manually set minimum altitude above ground. A circuit providing such a function is illustrated in block diagram form in FIG. 5. The circuit of FIG. 5 includes a minimums set device 150, which may be manually set in the cockpit, and which may take the form of a radio altimeter bug, and a minimums comparator 152 which compares the radio altitude with the preset minimum and generates an output whenever the aircraft drops below the minimum setting. The altitude of the minimums comparator is used to control a "MINIMUMS, MINIMUMS" warning generator 154 that generates the minimums warning and applies it, either directly or indirectly, to the transducer 96 (FIG. 2). In the embodiment illustrated, the minimums generator 154 is controlled via an inverter 156, a pair of type D flip-flops 158 and 160, and an AND gate 162 which serve to cause two repetitions of the word "MINIMUMS" to be repeated whenever the aircraft drops below the preset minimum, provided that a gate 164, whose function it is to minimize nuisance warnings, is also enabled.

Thus, in order to avoid such nuisance warnings, in order for the gate 164 to be enabled, the aircraft must be between 30 and 1000 feet above the ground, and there must be no weight on the wheels, and the landing gear must be down and the aircraft must be in the approach mode, the approach mode signal being applied to the gate 164 via an OR gate 166. As previously discussed, the logic circuitry of FIG. 1 switches to the take-off mode while the aircraft is still on an approach to permit the take-off modes to be enabled during a go-around after a missed approach, and when this occurs, the gate 164 is inhibited. While it is advisable to disable the minimums system during a go-around after a missed approach to minimize nuisance warnings during such a go-around it is also desirable to maintain it active during the approach. To provide this function, the approach mode signal is ORed with the output of an AND gate 168 which receives signals representative of flap and gear position and take-off power. Thus, as long as the gear is down, the flaps are down and take-off power is not present, the gate 164 is maintained enabled. However, should the pilot either raise the flaps or the gear or engage take-off power, the gate 164 would be disabled to avoid the nuisance warning.

As previously discussed, the mode switching logic of the present invention is operative not only to switch between two different criteria for generating a terrain clearance warning, but also to enable an excessive descent after take-off type of warning. As previously mentioned, a system for generating such a warning is disclosed in the previously-mentioned patent application entitled "ALTITUDE LOSS AFTER TAKEOFF WARNING SYSTEM UTILIZING TIME AND ALTITUDE" and illustrated in FIG. 6.

The system illustrated in FIG. 6 will be briefly discussed in order to illustrate its operation in conjunction with the mode switching circuitry previously discussed. The system illustrated in FIG. 6 utilizes signals representative of radio altitude, barometric altitude, barometric altitude rate, signals representative of the positions of the flaps and landing gear, signals representative of take-off power and whether the aircraft is in the take-off mode, a signal indicating whether there is any weight on the wheels and various validity signals. These signals can be obtained from the circuitry of FIG. 1 and/or from individual instruments such as a barometric altimeter 212 and a barometric altitude rate circuit 214. A vertical velocity signal such as the Z-velocity signal from an inertial navigation signal may be used to provide the altitude rate signal instead of the barometric rate circuit.

A signal from the radio altimeter 216 is applied to a sample and hold circuit 218 via a switch 220 that is closed only when the signal from the radio altimeter is valid. The output of the sample and hold circuit 218 is connected via a switch 222 to a summing junction 224 and to a scaling circuit 226 whose output is connected to a second summing junction 228. The output of the barometric rate circuit 214 is applied to an integrator 230 whose output is applied to the summing junction 224. The output of the summing junction 224 is applied to a second integrator 232 whose output is coupled to a comparator 234 and may be applied to the data bus 12 to provide a feet-sec. signal (FIG. 1). The output of the comparator 234 is coupled to an AND gate 236 whose output controls an aural warning generator 238 that operates a transducer 96 of FIG. 2.

Another one of the inputs of the AND gate 236 is coupled to the output of an AND gate 242 that also serves to enable the integrators 230 and 232. The AND gate 242 receives the no weight on wheels delayed ($\overline{WOW}_D$) signal, a barometric altimeter valid signal from the barometric altimeter 212 and a take-off mode (T/O MODE) signal from take-off mode logic circuitry. The fourth input to the AND gate 242 is from a three-input OR gate 250 that receives the flap up (FU), landing gear up (GU) and take off power signals. Thus, the logic circuitry of FIG. 1 serves to enable the excessive descent warning circuitry of FIG. 6 when appropriate to provide additional warnings.

The third input of the AND gate 236 is coupled to the output of a descent comparator 258 that compares the output of the barometric rate circuit 214 with a reference signal representative of zero feet per second obtained from a reference source 260. Another integrator 262 integrates the barometric rate signal from the barometric rate circuit 214 and applies the integrated signal to one of the inputs of the comparator 234 via a summing junction 264 which also receives a signal representative of ten feet of altitude from a reference circuit 266. The output of the integrator 262 is also coupled to another comparator 268 which compares the output from the integrator 262 with a signal representative of zero feet of altitude received from a reference circuit 269. The output of the comparator 268 is coupled to an OR gate 270 that has another input coupled to the output of the descent rate comparator 258 and an output coupled to an AND gate 272. Another input of the AND gate 272 is coupled to the output of the AND gate 242, and the output of the AND gate 272 is coupled to an enable input of the integrator 262.

In operation, and assuming that the signals from the barometric altimeter 212 are valid, the system is enabled by the AND gate 242 only when certain conditions are met. More specifically, the system is enabled only when the no weight on the wheels delayed ($\overline{WOW}_D$) and take-off mode (T/O MODE) signals are present and if any one of the take-off power (T/O PWR), the landing gear up (GU) or the flaps up (FU) signals are present.

When the aforementioned conditions are met, the AND gate 242 applies enabling signals to the AND gates 236 and 272, to the integrators 230 and 232, and to the sample and hold circuit 218 and switch 222. Thus, upon enabling of the integrators 230 and 232, the barometric rate signal or other appropriate vertical velocity signal is integrated by the integrator 230 to provide a signal representative of altitude gain or loss. This signal is again integrated with respect to time by the integrator 232 to provide a time-altitude or feet-seconds signal. Also, immediately after take off, and after the AND gate 242 is enabled, the output of the sample and hold circuit 218 is combined with the output of the integrator 230 to provide an altitude above ground reference signal for the output of the integrator 230. In the event that the radio altitude signal is not present, for example during a loss of track condition, the output of the sample and hold circuit 218 is zero feet, thereby assuming ground level reference. In addition, the output signal from the sample and hold circuit 218 is multiplied by a scaling factor such as, for example, 10%, by the scaling circuit 226 to provide a reference for the output of the integrator 232. The combined feet-seconds signal from the integrator 232 and the scaled reference signal from the scaling circuit 226 are combined and applied to the warning comparator 234 to be compared with the output from the integrator 262 received via the summing junction 264.

The integrator 262 integrates the output from the barometric rate circuit 214 to provide a signal representative of accumulated altitude loss after take off. This occurs because the integrator 262 is enabled only when the aircraft is descending, or when an altitude loss has already occurred. The enabling function is accomplished by the descent rate comparator 258 and the comparator 268. The descent rate comparator 258 compares the descent rate signal from the barometric rate circuit 214 with a zero feet per second reference signal from the reference source 260, and provides an enabling signal to the integrator 262 via the gates 270 and 272 only if the aircraft is descending. The comparator 268 compares the output of the integrator 262 with a zero foot reference signal and maintains the integrator 262 enabled as long as the output of the integrator 262 is representative of an accumulated altitude loss. Thus, once enabled after an initial descent, the integrator 262 is maintained enabled until all of the lost altitude has been regained. The altitude loss signal is offset by 10 feet by the summing circuit 264 and applied to the comparator 234. Because of the 10 foot offset, the aircraft must descend at least 10 feet before any warning will be given to thereby minimize nuisances.

The comparator 234 thus compares the accumulated altitude loss from the comparator 262 with the time-altitude or feet-seconds signal from the integrator 232 and provides a warning initiation signal to the gate 236 if the barometric altitude loss is excessive for the time-altitude product of the aircraft. This relationship is illustrated in FIG. 7. As is apparent from FIG. 7, during low altitudes or during the initial phases of flight when the time-altitude product is small, only 10 feet of altitude loss are permitted before a warning is generated. However, as the time-altitude product increases, the permitted altitude loss also increases until an altitude loss of 310 feet is permitted at a time-altitude product of 37,500 feet-seconds. Above 37,500 feet-seconds, the system is effectively disabled until the next take off or the next go-around after a missed approach.

An aural warning informing the pilot of a hazardous condition has been found to be quite effective, and in the present embodiment, the gate 236 is used to cause the aural warning generator 238 to generate a message such as "DON'T SINK". The message thus generated is applied to the transducer 96 (FIG. 2) either directly or indirectly through the intercommunication system of the aircraft. Thus, the additional warning is provided.

In operation, the selection of appropriate warning modes is accomplished by the latches of FIGS. 1 and 2 together with other discrete signals. The take-off mode signal of latch 34 in FIG. 1 serves to enable the "DON'T SINK" warning criteria when either the gear or flaps are retracted, or take-off power is applied and latched by latch 36 of FIG. 1. Similar conditions enable the warning criteria illustrated in FIG. 3. Once the conditions are met to reset latch 34 of FIG. 1 to the approach mode, the "DON'T SINK" signal is inhibited. However, the terrain clearance warning of FIG. 3 remains active until conditions are satisfied such that the warning envelope of FIG. 4 is active. This is controlled by latch 122 of FIG. 2. The operation of this latch occurs when the warning altitudes of both envelopes are equal, thereby providing a continuity of terrain clearance protection from take off to landing.

As previously discussed, the mission select signal (MISSION SEL) is used in numerous places to select the appropriate mode of operation and the appropriate warning criteria, and a suitable logic circuit for providing the mission select signal is illustrated in FIG. 8, and generally designated by the reference numeral 300. The reason for providing a circuit such as the circuit 300 is that once the mission select switch has been actuated by the pilot, it is necessary to provide a latch signal indicating that the mission selector switch had been actuated. Also, it is desirable to provide a circuit that automatically cancels the mission select signal when the flight parameters indicate that the aircraft is no longer in a tactical phase of flight.

However, in most aircraft, the mission select switch is a momentary contact switch, such as the switch 302, and does not provide a latched output. Thus, the circuit 300 is employed to provide such a latched signal when the momentary contact switch 302 is depressed and certain other conditions are met. The latching function is provided by a latch 304. In order to generate the mission select signal, the latch 304 is set by depressing the mission select switch 302 which grounds the input of an inverter 306 which applies an enabling signal to an AND gate 308. If the latch 304 had been in a reset condition for at least two seconds, the gate 308 will be fully enabled and set the latch 304 to generate the mission select signal An inverter 310 inverts the mission select signal and generates a not mission select signal which is applied to a two second delay circuit 312 to cause the gate 308 to be disabled two seconds after the mission select signal has been generated, thereby providing debouncing for the switch 302. Thus, a further actuation of the switch 302 will not be transmitted through the gate 308. Rather, a subsequent actuation of the switch 302, after a two second delay, will reset the latch 304 via a pair of gates 314 and 316 This occurs because two seconds after the generation of the mission select switch, the gate 314 will be enabled by the mission select signal applied to the gate 314 via a two second delay circuit 318. Thus, the mission select signal can be initiated and cancelled by alternate actuations of the switch 302. The delay provided by the delay circuits 312 and 318 prevent any contact bounce occurring in the switch 302 from causing an inadvertent set or reset of the latch 304.

Because typical tactical missions are performed at low altitudes, the latch 304 is automatically reset when the altitude of the aircraft exceeds a predetermined altitude above ground. This function is performed by a bistable multivibrator 320, a comparator 322 and associated circuitry.

When the not mission select signal is generated, it clears the multivibrator 320, thus causing its Q output to switch to a low state. Subsequent mission select sets the D input of the multivibrator to high but does not charge the output. The comparator 322 compares the altitude above ground or radio altitude of the aircraft with one or more predetermined altitude references. In the illustrated embodiment, two altitude references corresponding to 1200 feet and 2450 feet are provided by a pair of reference voltage circuits 324 and 326, respectively. The appropriate one of the reference voltage generators 324 and 326 is selected by a switch 328 which selects the reference voltage generator 326 corresponding to 2450 feet when the landing gear is down and the reference voltage generator 324 which corresponds to 1200 feet when the landing gear is up.

The signal from the switch 328 is compared by the comparator 322 with the radio altitude signal received from a summing junction 330. As long as the radio altitude is below the selected reference altitude, the output of the comparator 322 remains low; but when the radio altitude exceeds the reference altitude, the output of the comparator 322 clocks the multivibrator 320 and resets the latch 304. Simultaneously, the output of the comparator 322 closes a switch 332 to apply a 200 foot bias signal from a reference source 334 to the summing junction 330. This biases the output signal from the summing junction 330 by 200 feet to provide a hysteresis effect that prevents the multivibrator 320 from being toggled again unless the altitude of the aircraft drops more than 200 feet.

Most aircraft have an indicator light to indicate that a mission has been selected. For such aircraft having an indicator light such as an indicator lamp 336, there is provided circuitry including an inverting amplifier 338 and an OR gate 340 that illuminates the lamp 336 when a mission has been selected The light 336 is also energized by a test signal applied to the other input of the OR gate 340.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system for aircraft comprising:

a source of signals representing aircraft flight parameters;
   a source of signals representative of the power level of the engine of the aircraft;
   first warning means responsive to said flight parameter signals for generating a warning in accordance with a first predetermined relationship between flight parameters;
   second warning means responsive to said flight parameter signals for generating a warning signal in accordance with a second predetermined relationship between flight parameters;
   means responsive to said power level signals for providing a signal representative of take-off power; and
   means responsive to said take-off power signal for enabling said first warning means to be generated only if said take-off power signal is present;
   wherein said take-off power signal providing means includes means for relaying the generation of the take-off power signal for a first predetermined time interval after an engine has reached take-off power, and means for delaying the take-off power signal by a second predetermined time interval when the speed of the aircraft exceeds a predetermined airspeed.

2. A ground proximity warning system as recited in claim 1 wherein said second predetermined time interval selected is larger than said first predetermined time interval.

3. A ground proximity warning system as recited in claim 2 wherein said predetermined air speed is approximately 100 knots.

4. A ground proximity warning system as recited in claim 1 wherein said aircraft further includes means manually operable by the pilot to indicate that a tactical mission mode of operation has been selected, and means for automatically enabling said second warning means upon the actuation of said manually operable means.

5. A ground proximity warning system for an aircraft comprising:

means for receiving a signal representative of the rate of change of barometric altitude of the aircraft;
   means responsive to said receiving means for twin-integrating the rate of change of barometric altitude signal and generating a time-altitude signal that is a function of the integrated barometric altitude rate signal and the length of time that the aircraft has been flying;
   first aircraft warning means;
   second aircraft warning means; and
   means responsive to said time-altitude signal for selectively enabling said first or second aircraft warning means in accordance with the value of the time- altitude signal.

6. A time-altitude signal generator for use with an aircraft control or warning system comprising:

means for receiving a signal representative of the altitude of the aircraft with respect to a datum; and
   signal generating means responsive to said receiving means for differentiating and double integrating said altitude representative signal to generate a time-altitude signal that is the function of the altitude of the aircraft and the length of time that the aircraft has been flying.

7. A ground proximity warning system as recited in claim 6 wherein said time-altitude signal is generated by twice integrating a signal representative of the time rate of change of the barometric altitude.

8. A ground proximity warning system for aircraft comprising:
- a source of signals representing aircraft flight parameters;
- a source of signals representing vertical motion of the aircraft;
- means responsive to the vertical motion representative signal for providing a signal representative of the altitude of the aircraft;
- means responsive to the altitude signal for providing a time-altitude signal that is a function of the altitude signal and the length of time that the aircraft has been flying;
- first warning means responsive to said flight parameters for generating a warning signal in accordance with a first predetermined relationship between flight parameters;
- second warning means responsive to said flight parameter signals for generating a warning signal in accordance with a second predetermined relationship between flight parameters; and
- means responsive to said time-altitude signal for enabling one or the other of said first or second warning means in accordance with the value of the time altitude signal.

9. A system for aircraft comprising:
- means for receiving signals representing the altitude of the aircraft above a datum;
- means responsive to said receiving means for generating a signal representing the accumulated altitude loss or gain of the aircraft with respect to a predetermined datum since take-off; and
- means responsive to said accumulated altitude signal for generating a time-altitude signal which is a function of the altitude of the aircraft with respect to said predetermined datum and the time aircraft has been flying.

10. A system as recited in claim 9 further including means for determining said predetermined datum.

11. A system as recited in claim 10 wherein said predetermined datum determining means includes means for providing a radio altitude signal and means for sampling the radio altitude signal.

* * * * *